US012681181B2

(12) United States Patent
Buchter

(10) Patent No.: US 12,681,181 B2
(45) Date of Patent: Jul. 14, 2026

(54) MULTISPECTRAL ACTIVE REMOTE SENSOR

(71) Applicant: IRIDESENSE, Issy-les-Moulineaux (FR)

(72) Inventor: Scott Buchter, Espoo (FI)

(73) Assignee: IRIDESENSE, Issy-les-Moulineaux (FR)

( * ) Notice: Subject to any disclaimer, the term of this patent is extended or adjusted under 35 U.S.C. 154(b) by 1020 days.

(21) Appl. No.: 17/796,566

(22) PCT Filed: Feb. 1, 2021

(86) PCT No.: PCT/EP2021/052273
§ 371 (c)(1),
(2) Date: Jul. 29, 2022

(87) PCT Pub. No.: WO2021/152168
PCT Pub. Date: Aug. 5, 2021

(65) Prior Publication Data
US 2023/0053187 A1      Feb. 16, 2023

Related U.S. Application Data

(60) Provisional application No. 62/968,090, filed on Jan. 30, 2020.

(51) Int. Cl.
*G01S 17/89* (2020.01)
*G01J 3/28* (2006.01)
*G01S 7/481* (2006.01)

(52) U.S. Cl.
CPC ............. *G01S 17/89* (2013.01); *G01J 3/2823* (2013.01); *G01S 7/4817* (2013.01); *G01J 2003/2826* (2013.01)

(58) Field of Classification Search
CPC .. G01J 3/28; G01J 2003/2826; G01S 7/48–51
See application file for complete search history.

(56) References Cited

U.S. PATENT DOCUMENTS

| | | | |
|---|---|---|---|
| 6,101,034 A | 8/2000 | Cox et al. | |
| 10,802,120 B1 * | 10/2020 | LaChapelle | ........... G01S 7/4917 |
| 2008/0061222 A1 * | 3/2008 | Powers | .................. B82Y 15/00 |
| | | | 257/E31.127 |
| 2010/0110515 A1 * | 5/2010 | Blais-Ouellette | ...... G02B 5/203 |
| | | | 359/15 |
| 2013/0201322 A1 * | 8/2013 | Park | ...................... G02B 21/16 |
| | | | 359/385 |
| 2017/0307736 A1 * | 10/2017 | Donovan | ................ G01S 17/10 |

(Continued)

FOREIGN PATENT DOCUMENTS

WO       2019/180019       9/2019

OTHER PUBLICATIONS

International Search Report dated Apr. 29, 2021, for PCT/EP2021/052273, 3 pp.

(Continued)

*Primary Examiner* — Yuqing Xiao
*Assistant Examiner* — Chia-Ling Chen
(74) *Attorney, Agent, or Firm* — Alumen Law IP PC

(57) ABSTRACT

Disclosed is a radiation arrangement for a multispectral active remote sensing device. The arrangement includes a transceiver, a detector, and a wavelength-adjustable narrow band stopper.

20 Claims, 9 Drawing Sheets

(56) References Cited

U.S. PATENT DOCUMENTS

| 2018/0027314 A1* | 1/2018 | Fok ...................... G02B 6/2938 |
| | | 370/497 |
| 2018/0088431 A1* | 3/2018 | Holt ........................ G02F 1/157 |
| 2019/0107656 A1* | 4/2019 | Black ...................... A61F 9/022 |
| 2019/0306386 A1* | 10/2019 | Akkaya ............... G02F 1/13473 |
| 2022/0221584 A1* | 7/2022 | Chen ....................... G01S 17/87 |
| 2022/0319149 A1* | 10/2022 | Kurtoglu .............. G06V 10/147 |
| 2023/0057064 A1* | 2/2023 | Jaanson ................. G01S 7/487 |
| 2024/0201337 A1* | 6/2024 | Smith ..................... G01S 17/10 |

OTHER PUBLICATIONS

Written Opinion of the ISA dated Apr. 29, 2021, for PCT/EP2021/052273, 6 pp.

* cited by examiner $$\Delta A = A2 - A1$$

$$u\Delta A = \sqrt{(uA2)^2 + (uA1)^2}$$

$$u\Delta A = \sqrt{\phantom{x}^2 + \phantom{x}^2} = $$

MULTISPECTRAL ACTIVE REMOTE SENSOR

This application is the U.S. national phase of International Application No. PCT/EP2021/052273 filed Feb. 1, 2021, which designated the U.S. and claims priority to U.S. 62/968,090 filed Jan. 30, 2020, the entire contents of each of which are hereby incorporated by reference.

TECHNICAL FIELD

The invention relates to multispectral active remote sensing, and more particularly, to multispectral LiDAR devices acquiring data at different wavelengths to allow a recording of a diversity of spectral reflectance from objects.

BACKGROUND ART

Multispectral active remote sensors include one or more illumination sources producing a radiation with multiple wavelengths to illuminate an object, one or more sensors to measure the backscattered radiation and analyze the spectral response of the object.

Such systems can be configured to scan multiple points in a 2D or 3D space to generate a frame, an image or a sequence of frames or images. When a large number of wavelengths are analyzed, these multispectral active remote sensors may be referred to as hyperspectral sensors.

Technical Problem

In traditional multispectral active remote sensing, different wavelengths are transmitted and received. Detecting the variety of wavelengths is performed either sequentially, with a single receiver, or in parallel, with the number of receivers equal to the number of wavelengths.

These approaches to capturing multispectral data have shortcomings in terms of costs and performance. Indeed, there is a tradeoff between the spatial information and spectral information. The broader the bands of wavelengths, the better the spatial information: the energy level of radiation is higher, which increases the signal to noise ratio. This can be used to improve the spatial resolution, the detection range or the sensitivity of the multispectral systems. Conversely, the narrower the bands of wavelengths, the better the spectral resolution. This can be used to improve the accuracy of the spectral signature to distinguish a material with close spectral signatures.

DISCLOSURE OF INVENTION

An object of embodiments of the invention is to improve both the spatial information and the spectral information in a multispectral active remote sensing system.

In order to do so, rather than illuminating a target with a plurality of narrow band radiations, the target is illuminated with broadband radiations. The spectral profile of the illumination radiations is analyzed using inverse narrowband filters. In other words, instead of bandpass filtering of the spectrum to obtain a narrow wavelength range for transmission, a "notch" filter is used to remove a single wavelength band from the broadband spectrum. In order to recover the spectrum of the target, the sequence of measurements is similar to the direct filtering method with the exception that a measurement using the full spectrum is taken which provides the total return energy. Then, measurements are taken sequentially with one spectral band removed from the sequential transmissions each time (e.g., by sequentially adjusting the frequency of the notch filter).

In other words, a distinct advantage to this technique is that nearly all the broadband radiation energy is available for range measurements. For example, in the direct filtering approach with 10 narrow bands, only ~1/10 th of the total energy is available for range measurements. In the inverse approach it is ~9/10 the of the energy.

Namely, the disclosure provides a radiation arrangement for a multispectral active remote sensing device, comprising:

an transceiver configured for receiving a radiation beam from a radiation source; the transceiver being further configured for outputting a transmitted part of the radiation beam on a target, and further configured to receive a reflected part of the radiation beam from the target; wherein the radiation beam has a broadband spectral range, a detector configured to detect a time-of-flight and an radiation power of the reflected part of the radiation beam; and a wavelength-adjustable narrow band stopper arranged on an radiation path from the radiation source to the detector, wherein the wavelength-adjustable narrow band stopper is configured to transmit the radiation beam in all the spectral range but a narrow band centered on a selected wavelength, wherein the wavelength-adjustable narrow band stopper is further configured to sequentially set the selected wavelength to another wavelength of the spectral range, such that the detector receives a partial radiation power, which is the radiation power of the received reflection of the radiation beam in all the spectral range but the narrow band centered on said selected wavelength, wherein the optical detector is further configured to sequentially detect the partial radiation power in association with the selected wavelength.

Spectrally speaking, the radiation arrangement may be configured to scan the whole spectral range, in an inverse way, i.e. by successively blocking narrow bands within the whole spectral range.

By contrast with such an inverse way, a direct filtering refers to scanning the whole spectral range, in an direct way, i.e. by successively transmitting narrow bands within the whole spectral range.

One would understand that a reflected part of the radiation beam refers to either backscattered or specular reflection of the transmitted part or combination thereof. A lot of different multispectral active remote sensing devices may comprise an arrangement such as the arrangement hereinabove described. For instance, the multispectral active remote sensing device may be a radar or a LiDAR.

Namely, the radiation arrangement can be applied to multispectral imaging systems in astronomy, agriculture, autonomous driving, geosciences, geophysics, physics and surveillance such as multispectral LiDAR systems, laser-based telescope (e.g. with a laser guide star). Embodiments can also be applied to multispectral imaging systems in molecular biology, in vivo non-contact imaging and bio-medical imaging such as multispectral microscopy systems, imaging spectrometer, imaging spectroscope and diagnostic tools. Embodiments can be applied to multispectral systems for purpose of finding objects, identifying materials based on a spectral signature, or detecting processes. Thanks to the inverse way of spectrally scanning, the presence of far field objects may be detected Traditional multispectral active remote sensing systems work for a relatively short range. System according to embodiments of the invention can work at a much longer range for detection purposes. The spectral signature information may be available beyond a certain range (or will be noisy), but the system will at least be able to detect.

Such an arrangement may comprise one or more of the following features or combination thereof.

In embodiment, the wavelength-adjustable narrow band stopper is arranged on a radiation path of the radiation beam from the radiation source to the transceiver.

One can understand that in this configuration, the wavelength-adjustable narrow band stopper is arranged on the transmission side of the multispectral active remote sensing. In embodiment, the wavelength-adjustable narrow band stopper is arranged on a radiation path of the radiation beam from transceiver to the detector.

One can understand that in this configuration, the wavelength-adjustable narrow band stopper is arranged on the receiving side of the multispectral LiDAR.

In embodiment, the wavelength-adjustable narrow band stopper is further configured to sequentially select a number N of selected wavelength, wherein N is comprised between 4 and 6.

In embodiment, the multispectral active remote sensing device is a multispectral LiDAR, wherein:
   the radiation arrangement is an optical arrangement, and
   the radiation source is a laser source, the radiation beam being a laser beam,
   the transceiver is an optical transceiver,
   the detector being an optical detector, the radiation power being an optical power, and the partial radiation power being a partial optical power.

For instance, the technique can be implemented with a multispectral LiDAR comprising a broadband laser source and single receiver. It can be advantageously applied to multispectral LiDAR for far field/long range detection: indeed, the special configuration of the LiDAR makes it possible to detect target located to a larger range compared to the prior art. Indeed, distinct advantage of such a configuration is that nearly all the broadband laser energy is available for range measurements.

Thanks to this technique, the performances are similar to a multispectral LiDAR comprising a laser source which includes a tunable laser, while retaining the simplicity and low cost of a broadband source.

The spectral range could be basically anything from the UV to the far IR, for instance as broad as 200-10000 nm. In a preferred embodiment, In embodiment, the spectral range of the laser beam is about 300 nm, between 1400 nm and 1700 nm.

In embodiment, the wavelength-adjustable narrow band stopper comprises a filter per selected wavelength, wherein the filter is a notch filter having a narrow band value comprised between 9 nm and 20 nm, centered on said selected wavelength.

In embodiment, wavelength-adjustable narrow band stopper comprises a filter per selected wavelength, wherein the filter is selected in the list consisting in:
   a Hard Coated Bandpass Filter having an Optical Density value of 4.0, and a narrow band value of 45 or 50 nm centered on said selected wavelength, or
   dichroic filters. *
   Especially, Hard Coated OD 4 Bandpass Filters are ideal for eliminating unwanted background noise and enhancing the signal to noise ratio for a range of imaging applications. Unlike traditional filters, which require multiple substrates and coatings, these hard-coated filters are fabricated using only a single substrate. Dichroic filters are typically used in reflection that means reflecting unwanted wavelengths, while transmitting the desired portion of the spectrum. These filters are designed to work at a determined angle of incidence. In such a scenario, specific wavelengths range are reflected while transmitting others.

In embodiment, the wavelength-adjustable narrow band stopper comprises a wavelength-tunable notch filter configured to block the narrow band centered on a notch wavelength, wherein the notch filter is controlled such as to tune the notch wavelength on the selected wavelength value.

In embodiment, the wavelength-tunable notch filter is based on liquid crystal modulators.

In embodiment, the wavelength-adjustable narrow band stopper comprises volume holographic notch filters.

In embodiment, the transceiver has a spatial scanning function.

In embodiment, the detector comprises a single radiation power sensor.

The disclosure also provides a multispectral active remote sensing device comprising an arrangement as described hereinabove, further comprising the radiation source.

The broadband laser source can be a solid-state laser source for instance. In embodiments, the broadband laser source is not limited to a supercontinuum source. It could be any spectrally broadband light such as Raman lasers for instance.

The disclosure also provides a method for operating: an arrangement as described hereinabove, or the multispectral active remote sensing device comprising the same, the method comprising:
   sensing, by the detector, a total radiation power, which is the optical power of the reflected part of the radiation beam on the whole spectral range, and
   sensing, by the detector, the partial radiation power associated to a selected wavelength, then
   calculate a band radiation power associated to said selected wavelength, by comparison of the total radiation power and the partial radiation power.

The disclosure further provides a vehicle comprising an arrangement as described hereinabove.

BRIEF DESCRIPTION OF DRAWINGS

Other features, details and advantages will be shown in the following detailed description and on the figures, on which.

DESCRIPTION OF EMBODIMENTS

Figures and the following detailed description contain, essentially, some exact elements. They can be used to enhance understanding the invention and, also, to define the invention if necessary.

For the sake of conciseness, the elements which are similar or equivalent through the description will be described with reference to the same reference numbers.

Figure 1:
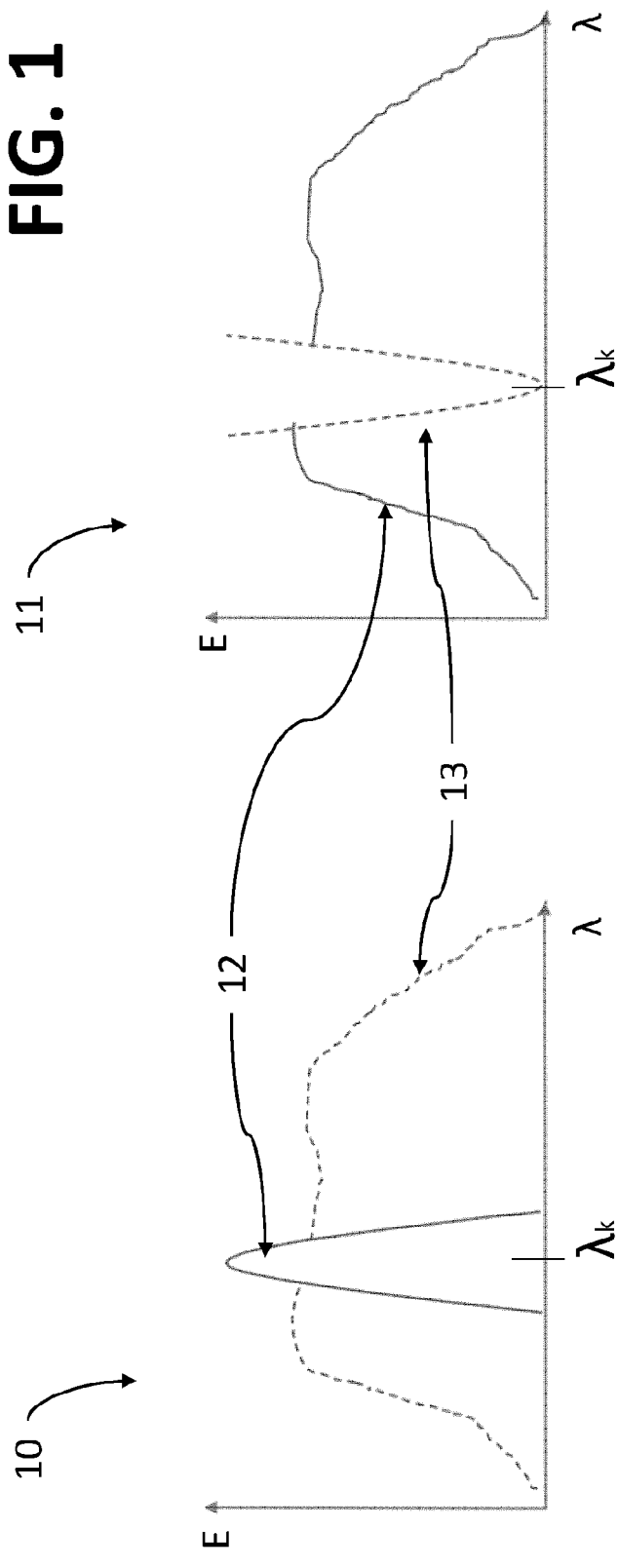
FIG. 1 represents schematics of broadband spectra for two different kind of filtering.

With reference to FIG. 1, a principle implemented in the following will be explicated. One can refer to this principle as "inverse filtering".

FIG. 1 represents two schematics of broadband spectra.

The schematics 10 on the left corresponds to a spectrum in the case where a filtering is performed to only transmit a narrowband part of the spectrum, as traditionally configured for instance in multispectral LiDARs.

Indeed, in multispectral LiDARs, it is required to associate spectral information, which are Time-of-flight ToF and optical power, to a specific wavelength $\lambda_k$ of the broadband spectrum. Therefore, a spectral filtering is performed, wherein the filtering has a bandwidth corresponding to the narrowband part of the spectrum and is centered on the specific wavelength.

As one can see on the figure, a measured signal 12 in this case is narrowband, centered on the specific wavelength $\lambda_k$. Therefore, the total energy measured is low because most of the light is rejected light 13.

By contrast, the schematics 11 on the right corresponds to a spectrum in the case where the filtering is performed to only block a narrowband part of the spectrum, centered on the specific wavelength $\lambda_k$, while transmitting the rest of the broadband spectrum.

As one can see, a measured signal 12 in this case is broadband. Therefore, the total energy measured is high because the rejected light 13 in this case is narrowband.

This last technique will be used in the following optical arrangements for multispectral LiDARs as described below.

For instance, in order to deduce the optical power on a specific wavelength $\lambda_k$ of the broadband spectrum, one can both measure:

an unblocked optical power on the whole broadband spectrum, without any narrowband blocking, and a blocked optical power on the whole broadband spectrum, with a narrowband blocking on the specific wavelength $\lambda_k$.

Then, one can deduce the optical power on the specific wavelength $\lambda_k$ of the broadband spectrum by comparison of the unblocked optical power and the blocked optical power.

In general, any kind of narrowband blocker can be used to perform such an inverse filtering. Such a narrowband blocker can for instance being also referred to as a band-stop filter or band-rejection filter, and is a filter that passes most frequencies unaltered, but attenuates those in a specific range to very low levels.

For multispectral applications, one would use for instance notch filters. A notch filter is a band-stop filter with a narrow stopband, i.e. a high Q factor.

Figure 2:
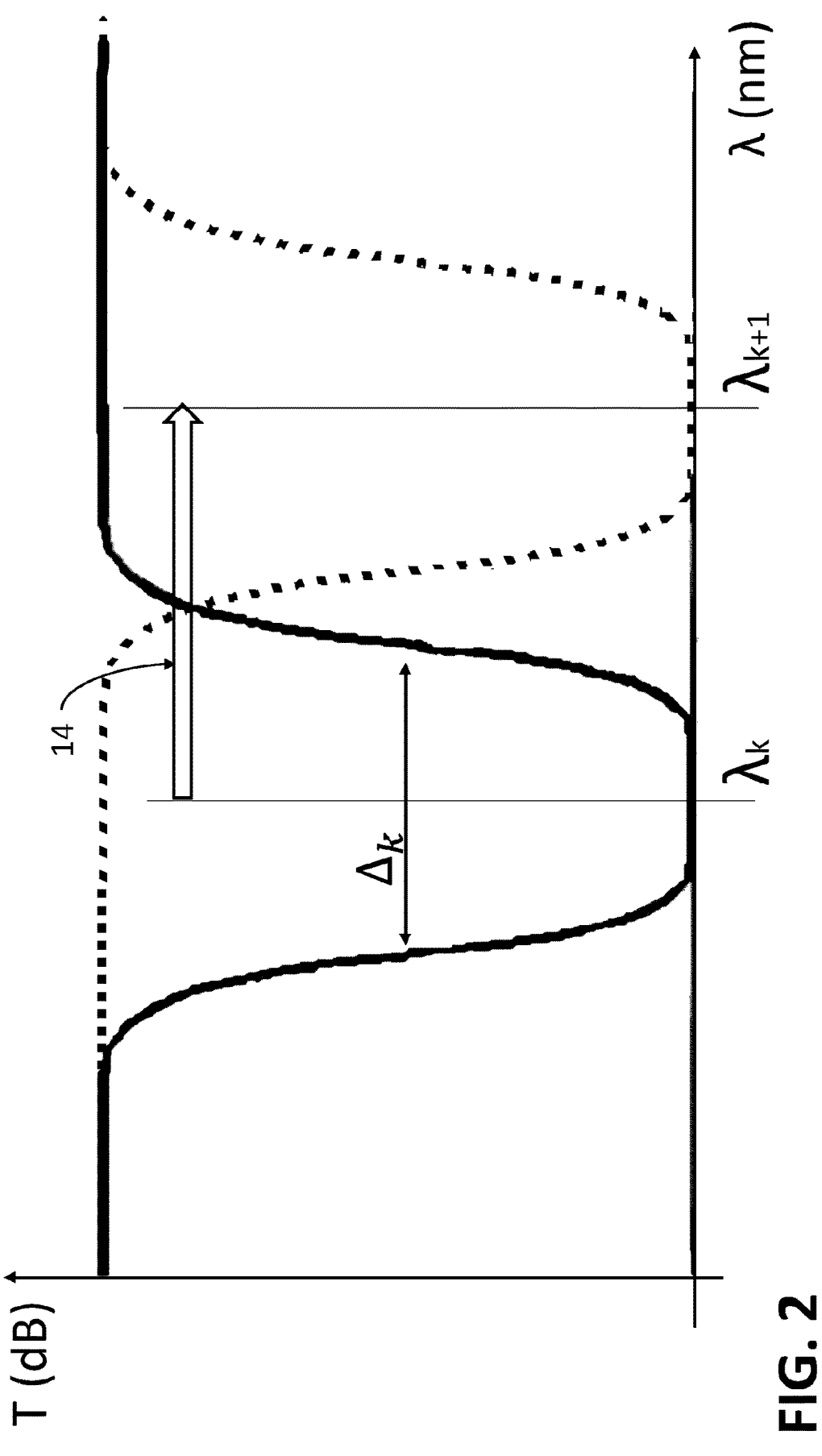
FIG. 2 schematically illustrates the spectral transmission of a tunable notch filter.

FIG. 2 schematically illustrates the spectral transmission of a tunable notch filter that can be used in optical arrangements for multispectral LiDARs, in order to perform the narrowband blocking as described above.

A tunable filter is a filter wherein certain filter parameters are tunable, either manually or with an electronic control system. Applied to notch filters, the tunable parameters may specifically be:

the center wavelength of the narrowband, which can be varied; and, in some cases, the bandwidth $\Delta_k$ of said narrowband.

For illustration purpose, one can see on the figure that the transmission is low on the narrowband part of the spectrum which centered on the specific wavelength $\lambda_k$. In other words, the attenuation is high on said narrowband part of the spectrum.

For the sake of clarification, such a narrowband may be also referred to as stop-band, or as "notch", and the center wavelength of the narrowband may also be referred to as a blocked wavelength.

A second stop-band centered on a second wavelength $\lambda_{k+1}$ is illustrated for clarification. As represented by the arrow 14, the spectral blocking may be shifted from the first wavelength $\lambda_k$ to the second wavelength $\lambda_{k+1}$ by operating the tunable notch filter to set the blocked wavelength from the first wavelength $\lambda_k$ to the second wavelength $\lambda_{k+1}$.

Advantageously, by selecting successively different specific wavelengths $\lambda_k$, $\lambda_{k+1}$ for k=1 to N, as represented on the figure with the example of two specific wavelengths $\lambda_k$, $\lambda_{k+1}$ one can spectrally scan, by inverse filtering, the whole broadband spectrum.

Based on research and simulations, a number N selected in the range 4 to 6 of stop-bands, in a broadband bandwidth of 300 nm extending from 1400 to 1700 nm, appear to be sufficient for automotive applications in which a multispectral LiDAR is used to detect range and spectral information regarding the surroundings of the vehicle.

One would remark that, advantageously, a single measure of optical power on the whole broadband spectrum, without any narrowband blocking, is enough to deduce the optical power of any specific wavelength, when the measures are performed for a same target in the same direction.

There are different types of tunable notch filters that can be used for multispectral LiDAR application. For instance, one kind is tunable notch filters based on liquid crystal modulators—kind of optical modulators which are based on liquid crystals. Liquid crystals are substances which are liquid but not optically isotropic—which is unusual for liquids. They contain long molecules which have a tendency to get aligned to each other, and that preferential orientation leads to anisotropic optical properties. The orientation of those molecules can be manipulated with an applied electric field: they tend to get aligned in a direction parallel to the field lines.

Eventually, the advantage is to make possible the live adjustment of the filtered wavelength on a broad spectral region (typically visible plus infrared, as 300 to 1000 nm range). For performance, outside the notch wavelength band, there is also high transmittance.

For instance, some Liquid crystal tunable notch filters are available from Kent Optronics: http://www.kentoptronics-.com/nptnf.html.

A first multispectral LiDAR 1 operating according to the principle of inverse filtering and comprising a tunable notch filter as described hereinabove is schematically pictured on FIG. 3.

As represented, the multispectral LiDAR 1 comprises a laser source 2 configured to transmit a broadband laser beam 15 as pictured by the spectrum 7.

The multispectral LiDAR 1 further comprises an optical transceiver 3 arranged for receiving the broadband laser beam 15 from the laser source 2. The optical beam transceiver 3 comprises an optical transmitter for outputting the received broadband laser beam 15. More specifically, the optical beam transceiver 3 comprises a spatial scanning unit for directing the received broadband laser beam 15 onto a target 6 on a selected direction. Then, the laser beam 15 is reflected, or back scattered, by the target 6. The optical transceiver 3 further comprises an optical receiver being configured to receive a reflected and/or back scattered part of the laser beam 15 from the target 6. In the following, said reflected and/or back scattered part will be referred to as a return signal 16. As represented by the arrow 8, the optical receiver is configured to transmit all the return signal 16 to a tunable notch filter 5.

The multispectral LiDAR 1 further comprises the tunable notch filter 5. The tunable notch filter 5 is configured to set successively the blocked wavelength to 5 pre-defined values spectrally spaced from each other by 60 nm. Therefore, the return signal 16 is successively filtered to remove block bands corresponding to the blocked wavelength.

The multispectral LiDAR 1 further comprises a broadband optical sensor 4, which is arranged to integrate the optical power of the filtered return signal 9, for each of the successive blocked wavelength.

The multispectral LiDAR 1 is further configured to synchronize the broadband optical sensor 4 with the laser source 2 in order to detect a TOF.

The multispectral LiDAR 1 is further configured to compare the integrated optical power of the filtered return signal 9 to an integrated optical power of the unfiltered broadband laser beam 15.

Such a multispectral LiDAR has several advantages compared to traditional multispectral LiDARs. Namely, thanks to the inverse filtering, the optical power detected being higher, it is possible to detect objects in spatial ranges that were unavailable while keeping the simplicity and cost of a single broadband laser source and a single broadband optical sensor.

Figure 3:
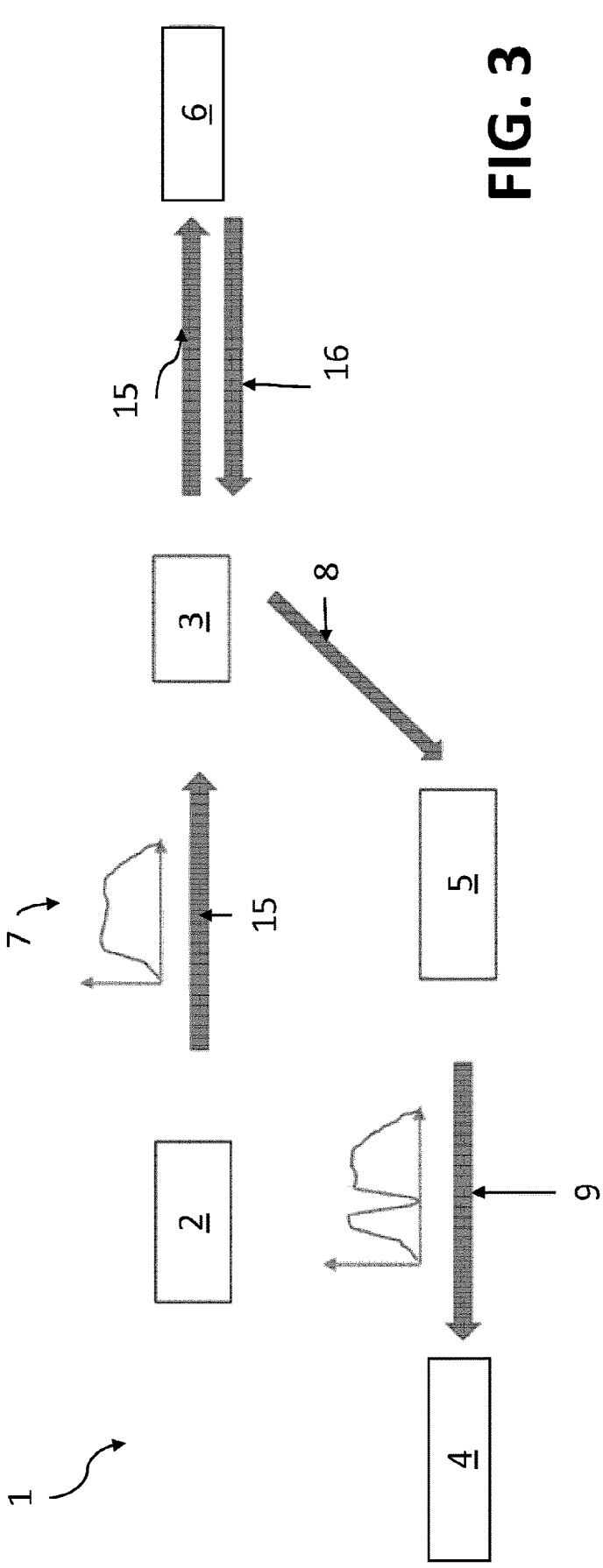
FIG. 3 is an optical functional schematic of a multispectral LiDAR device according to a first embodiment, wherein a tunable notch filter is arranged on the receiving side, with illustrations of spectral space at different step of propagation of an initial broadband pulse.
Figure 4:
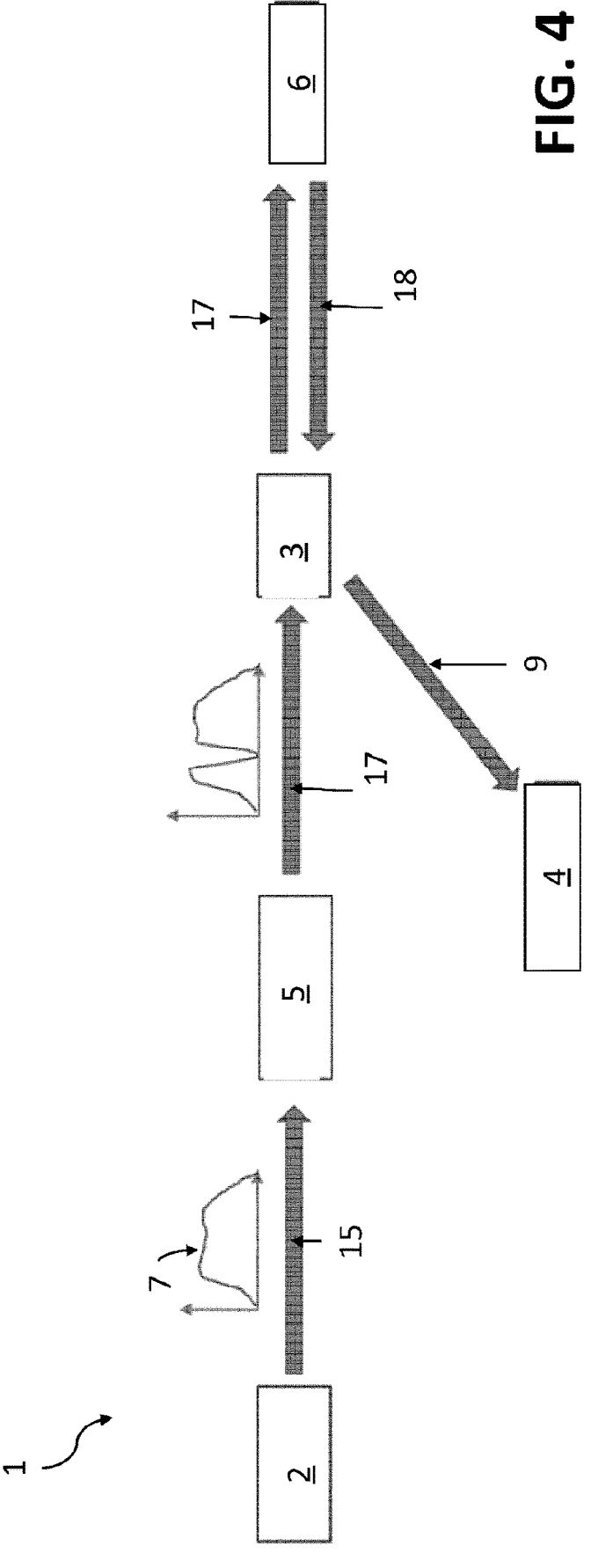
FIG. 4 is an optical functional schematic view of a multispectral LiDAR device according to a second embodiment, wherein a tunable notch filter is arranged on the transmitting side.

A second multispectral LiDAR, which is a variant of the first multispectral LiDAR 1 pictured on FIG. 3, is schematically pictured on FIG. 4.

A major difference between the first and the second multispectral LiDAR 1 is that the tunable notch filter 5 is arranged on the receiving optical path on the first multispectral LiDAR 1, whereas the tunable notch filter 5 is arranged on the transmitting optical path on the second multispectral LiDAR 1.

As pictured, the broadband laser beam 15 emitted from the laser source 2 is filtered by the tunable notch filter 5, and the filtered beam 17 is transmitted by the optical transceiver 3 to the target 6. The reflected filtered beam 18 is received by the optical transceiver 3, and transmitted to the broadband optical sensor 4.

Other variants for arranging multispectral LiDARs according to same principles are available.

Namely, one can contemplate to use other kind of block band filters, or association of block band filters, for instance as described below.

For instance, one can use thin film bandpass filters used in reflection, which can be for instance selected in those available from Edmund Optics: https://www.edmundoptics-.com/f/hard-coated-od-4-50nm-bandpass-filters/14321/.

Thin bandpass filters are designed to selectively transmit a portion of the spectrum while rejecting other wavelengths. Optical bandpass filters are ideal for a variety of applications, such as fluorescence microscopy, spectroscopy, clinical chemistry, or imaging. These filters are typically used in the life science, industrial, or R&D industries. These filters offer narrow rejection bands with great reflection of the designated laser wavelength.

Especially, Hard Coated OD 4 Bandpass Filters are ideal for eliminating unwanted background noise and enhancing the signal to noise ratio for a range of imaging applications. Unlike traditional filters, which require multiple substrates and coatings, these hard-coated filters are fabricated using only a single substrate.

Dichroic filters are typically used in reflection that means reflecting unwanted wavelengths, while transmitting the desired portion of the spectrum. These filters are designed to work at a determined angle of incidence. In such a scenario, specific wavelengths range are reflected while transmitting others as described in the following picture.

Indeed, unlike absorptive filters, dichroic filters are extremely angle sensitive. When used for any angle(s) outside of their intended design, dichroic filters cannot meet the transmission and wavelength specifications originally indicated.

For instance, one can use thin film notch filters used in transmission, such as for example those available from Edmund Optics: https://www.edmundoptics.com/c/notch-filters/689/#, or from Semrock: https://www.semrock.com/filtersRefined.aspx?id=18&page=1&so=0&recs=10.

In transmission, there is deep blocking of a narrow wavelength range while broad transmission of the other wavelengths. This must be enabled by a notch filter, also known as a band-stop filter or band-rejection filter. These filters reject/attenuate signals in a specific frequency band called the stop band frequency range and pass the signals above and below this band. They can be viewed as an inverse of a bandpass filter. In comparison to common band-stop filters, a notch filter is a band-stop filter with a narrow stopband, such as in the figure below.

Optical notch filters enable narrow stopband, that's why they can aid in the measurement of biomass concentration, growth of a culture of microorganisms, and other analytical techniques within the life science industry.

Optical density plays an important role in determining the strength of a notch filter. Indeed, like other filters, a notch filter can also be designed for various rejection levels, which is typically specified in terms of optical density. The optical density is defined by a numerical value that coincides with a % transmission through a given medium. With high optical density, there is almost full blocking on the designated stopband.

For instance, one can use volume holographic notch filters, such as for example those available from Kaiser Optical Systems: https://www.kosi.com/na_en/products/holographic-filters/notch-filters/standard-products.php A holographic optical element is an optical element (such as a lens, filter, beam splitter, or diffraction grating) that is produced using holographic imaging processes or principles. There are commonly used in optoelectronics applications. Especially, holographic notch filters are replacing dielectric filters in certain optical systems that incorporate single line laser sources.

Holographic notch filters are manufactured by illuminating a dichromated gelatin film with two laser beams forming an interference pattern. Dielectric notch filters are made by depositing two components in alternating layers.

Figure 5:
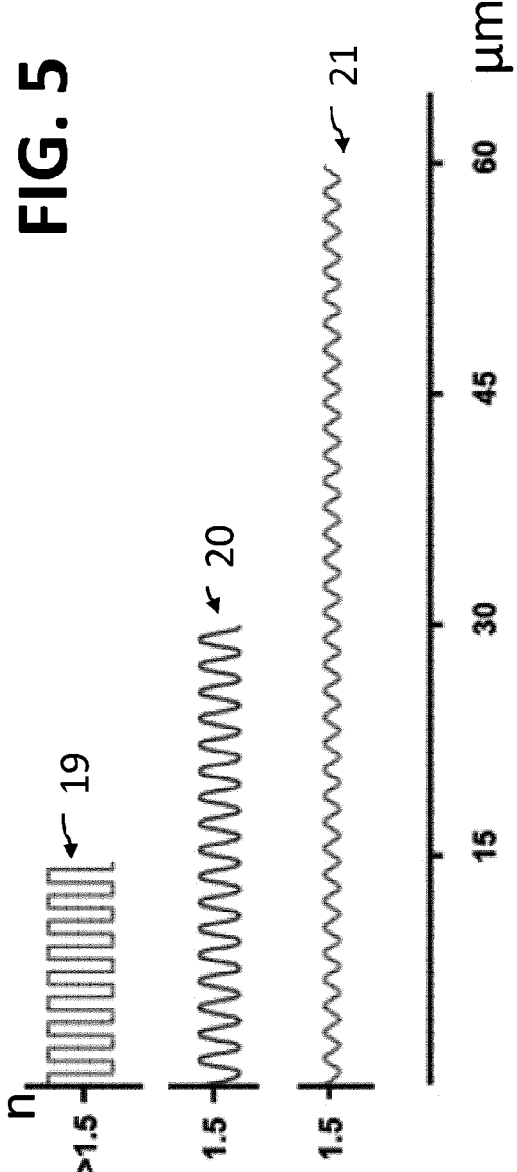
FIG. 5 represents a schematic of the refractive index variation as a function of depth in dielectric and holographic filters.

As schematically pictured on FIG. 5, the refractive index n variation profile over film thickness ($\mu$m) is different in function of the filter:

the profile 19 is squarewave in the dielectric stack filter, the profile 20 is sinusoidal in the holographic edge filter, the profile 21 is sinusoidal in the holographic notch filter, with lower amplitude of variation as the profile 20.

The result of this is that the holographic filters are free from extraneous reflection bands and provide significantly higher laser damage thresholds.

By design/construction, on the specified wavelength range (488 to 1400 nm for Kaiser Optical Systems), those products have great performance specifications i.e. very low transmission on the notch wavelength band in combination with an extremely narrow band.

One can note that, when selecting a block band filter, some tradeoffs and performance improvements may be done. For instance, narrower spectral bands can give better material discrimination but at the expense of requiring more measurements (time) to build the spectrum. For real time automotive applications this is a drawback but not necessarily for mining, agriculture, etc.

FIGS. 6 to 10 picture a qualitative analysis in order to explain a simulation method followed to simulate the performance of the inverse filtering applied to multispectral LiDARs.

Figures 6, 7, 8:
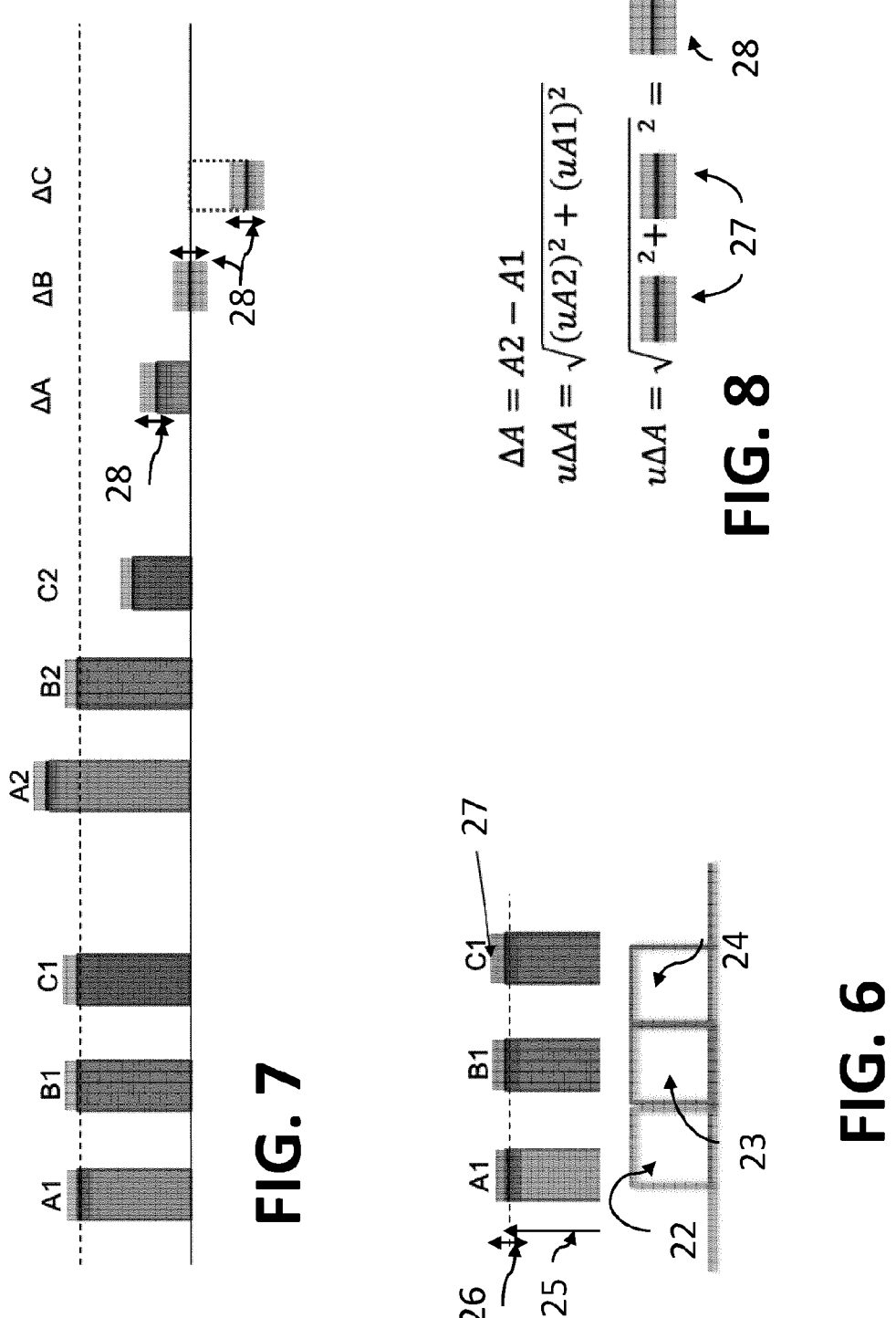
FIG. 6 schematically represents assumed measurement, after reflection on a first target, of optical power values filtered by traditional transmission filters, and associated noise.
FIG. 7 schematically represents the same as FIG. 6 for a second target, and associated noise comparisons.
FIG. 8 schematically represents uncertainty on the comparison of reflection on the first target and on the second target.

For the sake of simplification, as depicted on FIG. 6, it is assumed three spectral channels 22, 23 and 24, defined by perfect rectangular bandpass filters, within a defined spectral range. The filters are traditional filters, that is to say, the filters transmit only a defined spectral band while block the rest of the spectral range.

It is now assumed that a perfect broadband beam is sent on a first target which has a spectrally even reflection profile.

Therefore, the respective total energy A1, B1 and C1 of the respective spectral channel 22, 23 and 24 is assumed to be measured at an equal energy value 25, each with a noise incertitude. The noise is depicted by a rectangle 27 and represents, for the sake of realism, some measurement uncertainty, which is assumed to be purely statistical. One can therefore depict for each channel an equal noise value 26. Therefore, the noise doesn't depend on the signal intensity, which is realistic for distant targets measurements It is now assumed that the same perfect broadband beam is sent on a second target which has a spectrally uneven reflection profile, wherein the second target reflects a bit more in channel 22, and a bit less in channel 24.

FIG. 7 represents the total energy A1, B1 and C1 reflected by the first target, and total energy A2, B2 and C2 reflected by the second target under the same assumptions.

One can see that, in order to identify a difference $\Delta$A between the measured energy A1 reflected by the first target and the measured energy A2 reflected by the second target (idem for $\Delta$B or $\Delta$C), the difference $\Delta$A of energy value in any of the spectral channels needs to be larger than the noise value 26.

However, mathematically, when adding uncorrelated random numbers, they sum quadratically, as represented by the equations and schematic equations on FIG. 8, wherein u represents the uncertainty. One can see that the noise 26 represented by a rectangle 27 leads to an uncertainty 28 on the difference $\Delta$A.

Figures 9, 10:
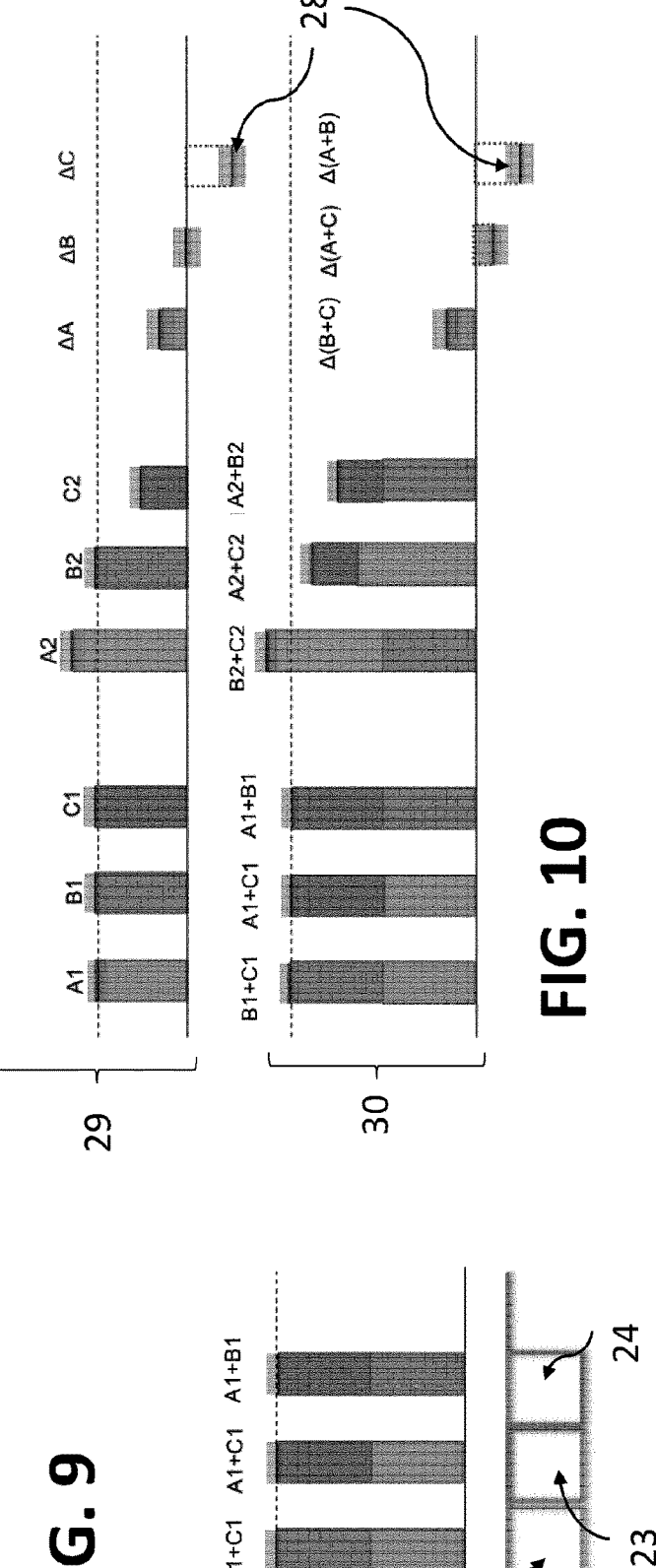
FIG. 9 schematically represents assumed measurement, after reflection on the first target, of optical power values filtered by block band filters, and associated noise.
FIG. 10 schematically represents the same as FIG. 9 for the second target, and associated noise comparisons.

By contrast, as depicted on FIG. 9, it is assumed three spectral blocked channels 22, 23 and 24, defined by perfect rectangular block band filters. For example, it is assumed to use notch filters. The targets and other assumptions are similar to those of FIGS. 6 to 8.

It is also assumed that the noise is the same, because it is realistic to assume that the noise is dominated by the readout noise.

The optical power measured for the first spectral channel is equal to B1+C1, because it transmits all the spectrum but the spectral blocked channel 22. Therefore, the optical power A1 is blocked. Same reasoning is performed for spectral blocked channels 23 and 24.

FIG. 10 pictures the results following the same assumptions for the traditional filters 29 and for the block band filters 30. For the sake of comparison, the schematics of the optical powers in the case of the traditional filters 29 are reiterated above the schematics corresponding to the block band filters 30.

As a conclusion from this presented qualitative analysis, one can see that even when measuring larger signals with notch filters, the features that are tried to be distinguished remain the same size. Namely, the uncertainty 28 on the difference $\Delta$(B+C) on a single spectral channel 22 with a blocking filtering is the same as the uncertainty of the difference $\Delta$A on the same single channel 22 with a traditional filtering.

Therefore, with similar optical units as for instance broadband source, and same bandwidth of spectral channels, using a blocking filtering does not imply a bigger uncertainty on the measures.

Figure 11:
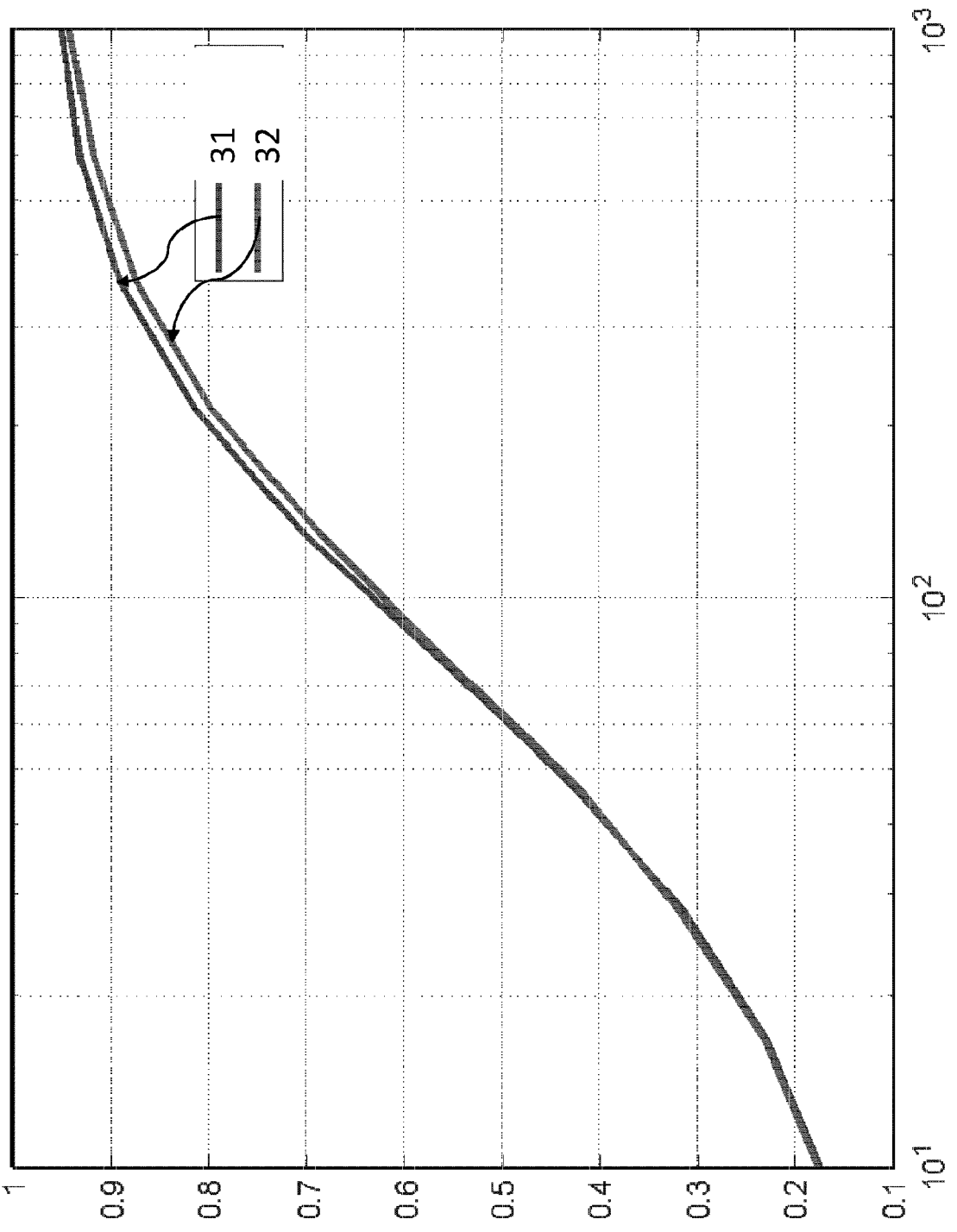
FIG. 11 pictures a graph of results of a first simulation, showing the true positive ratio over the signal noise ratio SNR, for the traditional filtering and for the notch filtering.
Figure 12:
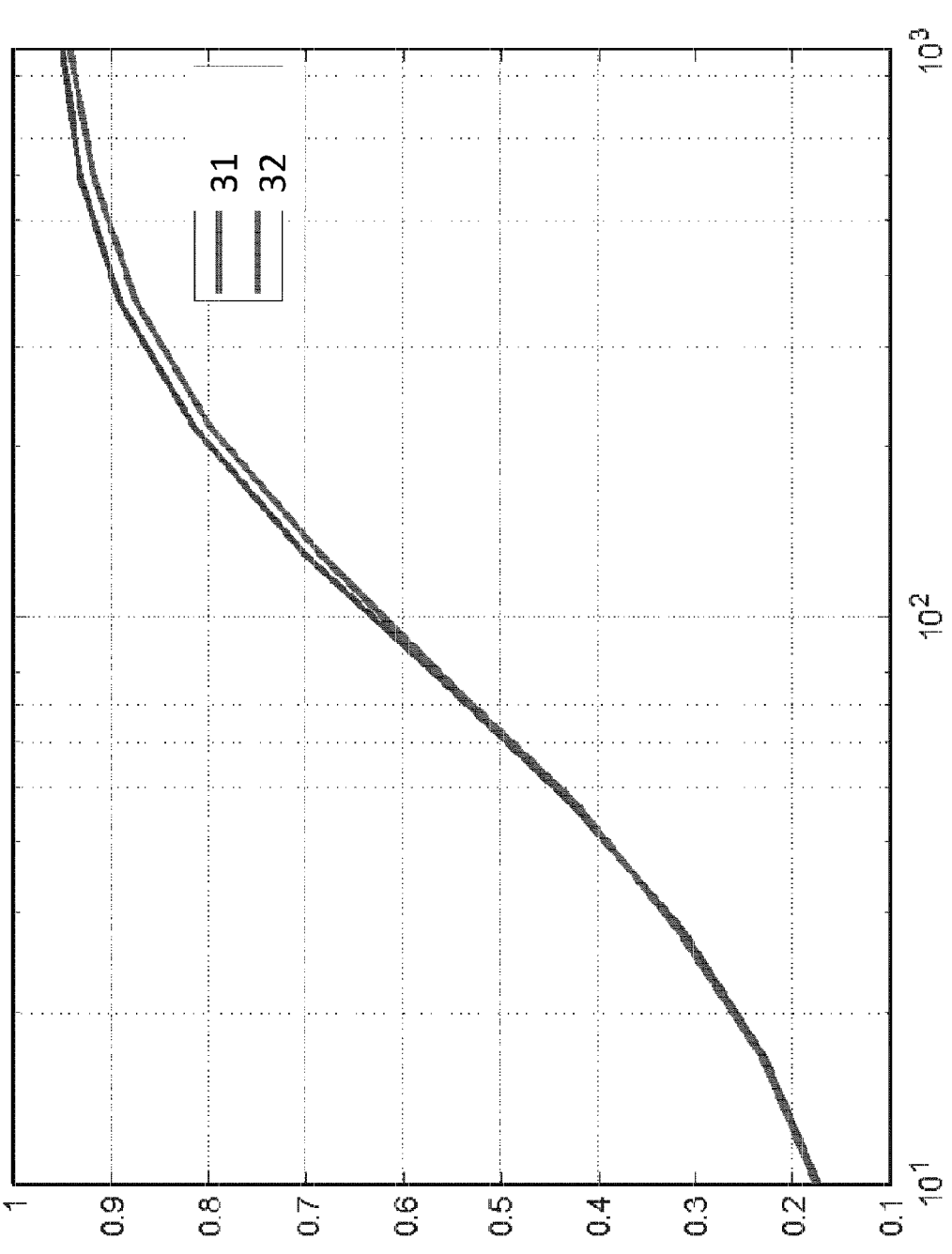
FIG. 12 pictures a graph of results of a second simulation, showing the true positive ratio over the signal noise ratio SNR, for the traditional filtering and for the notch filtering.

FIGS. 11 and 12 picture graphs of results of two simulations, showing the true positive ratio over the signal noise ratio SNR, for the traditional filtering 31, in transmission, and for the notch filtering 32, by blocking a band.

The simulations were performed under the following conditions:

Simulations were performed on 14 targets having different materials, and 400 measures of optical power on a defined spectrum were performed by target.

Spectra are weighted with the bandpass functions of the filters and summed, thereafter noise is added.

The SNR value is for 10% reflector for full bandwidth signal, so the true SNR per band would be lower.

On can see on FIG. 11 a first simulation, wherein it is assumed that the noise is constant e.g. doesn't depend on signal level. By contrast, in the second simulation depicted on FIG. 12, a fraction of the noise is assumed to also depend on the signal level. In this last simulation, one can see that the transmission filtering 31 outperform the notch filtering 32, but only slightly.

For the sake of precision, one would note that a spectral angle mapper was used for identifying the spectra. Indeed, a spectral angle mapper is robust, repeatable and fast and enables to compare the performance of filters. The identification rates would get higher with some other classification method.

One would further note that true positive ratio (TPR) applies to all 14 targets. In practice, some spectra are easier to distinguish than the others. For better TPR, the materials of the targets can be combined in classes.

As conclusions from simulations, one can note that a notch filter outperforms any other filtering method in measurement distance.

Spectral identification distance remains similar for bandpass and notch filters, when constant noise is taken into account. Intensity-dependent noise favors bandpass.

With bandpass filter, reference signal of the same band is recorded simultaneously With notch filters, reference of several bands is recorded, making spectral variability per spectral band ambiguous. Thus, better supercontinuum spectral stability is needed for notch filter.

Competing lidars specify measurement distance (e.g. 100 m) and object identification distance (e.g. 60 m). In our case measurement distance and identification distance will also be different.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

The invention claimed is:

1. Method for operating a radiation arrangement for a multispectral active remote sensing device controlled by an electronic control system, and comprising:

a transceiver configured for receiving a radiation beam from the radiation source; the transceiver being further configured for outputting a transmitted peart of the radiation beam on a target, and further configured to receive a reflected part of the radiation beam from the target; wherein the radiation beam has a broadband spectral range, a detector configured to detect a time-of-flight and a radiation power of the reflected part of the radiation beam; and a wavelength-adjustable narrow band stopper arranged on a radiation path from the radiation source to the detector, wherein the wavelength-adjustable narrow band stopper is configured to transmit the radiation beam in all the spectral range but a narrow band centered on a selected wavelength ($\lambda\_k$), wherein the wavelength-adjustable narrow band stopper is further configured to sequentially set the selected wavelength ($\lambda\_k$) to another wavelength ($\lambda\_k+1$), of the spectral range, such that the detector receives a partial radiation power, which is the radiation power of the received reflection of the radiation beam in all the spectral range but the narrow band centered on the selected wavelength, the method comprising:

sensing, by the detector, a total radiation power, which is the optical power of the reflected part of the radiation beam on the whole spectral range, and sensing, by the detector, the partial radiation power associated to the selected wavelength ($\lambda\_k$), then calculate a band radiation power associated to the selected wavelength ($\lambda\_k$), by comparison of the total radiation power and the partial radiation power.

2. A radiation arrangement for a multispectral active remote sensing device controlled by an electronic control system, comprising:

a transceiver configured for receiving a radiation beam from a radiation source; the transceiver being further configured for outputting a transmitted part of the radiation beam on a target, and further configured to receive a reflected part of the radiation beam from the target; wherein the radiation beam has a broadband spectral range, a detector configured to detect a time-of-flight and a radiation power of the reflected part of the radiation beam; and a wavelength-adjustable narrow band stopper arranged on a radiation path from the radiation source to the detector, wherein the wavelength-adjustable narrow band stopper is configured to transmit the radiation beam in all the spectral range but a narrow band centered on a selected wavelength ($\lambda\_k$), wherein the wavelength-adjustable narrow band stopper is further configured to sequentially set the selected wavelength ($\lambda\_k$) to another wavelength ($\lambda\_k+1$), of the spectral range, such that the detector receives a partial radiation power, which is the radiation power of the received reflection of the radiation beam in all the spectral range but the narrow band centered on said selected wavelength, wherein the optical detector is further configured to sequentially detect the partial radiation power in association with the selected wavelength, and wherein the electronic control system is further configured to calculate a band radiation power associated to the selected wavelength ($\lambda\_k$), by comparing the partial radiation power in association with the selected wavelength to a total radiation power, which is the optical power of the reflected part of the radiation beam on the whole spectral range.

3. The radiation arrangement according to claim 2, wherein the wavelength-adjustable narrow band stopper is arranged on a radiation path of the radiation beam from the radiation source to the transceiver, or the wavelength-adjustable narrow band stopper is arranged on a radiation path of the radiation beam from transceiver to the detector, or the wavelength-adjustable narrow band stopper is arranged on a radiation path of the radiation beam between the transceiver and the target.

4. The radiation arrangement according to claim 2, wherein the wavelength-adjustable narrow band stopper is further configured to sequentially select a number N of selected wavelength, wherein N is comprised between 4 and 6, wherein the spectral range of the laser beam is about 300 nm, between 1400 nm and 1700 nm.

5. The radiation arrangement according to claim 2, wherein the multispectral active remote sensing device is a multispectral LiDAR, wherein:

the radiation arrangement is an optical arrangement, and the radiation source is a laser source, the radiation beam being a laser beam, the transceiver is an optical transceiver, the detector being an optical detector, the radiation power being an optical power, and the partial radiation power being a partial optical power.

6. The radiation arrangement according to claim 5, wherein the wavelength-adjustable narrow band stopper comprises a filter per selected wavelength, wherein the filter is a notch filter having a narrow band value comprised between 9 nm and 20 nm, centered on said selected wavelength.

7. The radiation arrangement according to claim 5, wherein the wavelength-adjustable narrow band stopper comprises a filter per selected wavelength, wherein the filter is selected from the list consisting of:

a Hard Coated Bandpass Filter having an Optical Density value of 4.0, and a narrow band value of 45 or 50 nm centered on said selected wavelength, or dichroic filters.

8. The radiation arrangement according to claim 5, wherein the wavelength-adjustable narrow band stopper comprises a wavelength-tunable notch filter configured to block the narrow band centered on a notch wavelength, wherein the notch filter is controlled such as to tune the notch wavelength on the selected wavelength value.

9. The radiation arrangement according to claim 8, wherein the wavelength-tunable notch filter is based on liquid crystal modulators, or the wavelength-adjustable narrow band stopper comprises volume holographic notch filters.

10. The radiation arrangement according to claim 2, wherein the transceiver has a spatial scanning function, and the detector comprises a single radiation power sensor.

11. A multispectral active remote sensing device comprising an arrangement according to claim 1, further comprising the radiation source.

12. A multispectral LIDAR device comprising a laser radiation source and an optical radiation arrangement, the optical radiation arrangement comprising:

an optical transceiver configured for receiving a laser radiation beam from a laser radiation source; the transceiver being further configured for outputting a transmitted part of the laser radiation beam on a target, and further configured to receive a reflected part of the laser radiation beam from the target; wherein the laser radiation beam has a broadband spectral range, an optical detector configured to detect a time-of-flight and an optical radiation power of the reflected part of the laser radiation beam; and a wavelength-adjustable narrow band stopper arranged on an radiation path from the radiation source to the detector, wherein the wavelength-adjustable narrow band stopper is configured to transmit the laser radiation beam in all the spectral range but a narrow band centered on a selected wavelength ($\lambda$_k), wherein the wavelength-adjustable narrow band stopper is further configured to sequentially set the selected wavelength ($\lambda$_k) to another wavelength ($\lambda$_k+1), of the spectral range, such that the optical detector receives a partial optical radiation power, which is the optical radiation power of the received reflection of the laser radiation beam in all the spectral range but the narrow band centered on said selected wavelength, wherein the optical detector is further configured to sequentially detect the partial optical radiation power in association with the selected wavelength.

13. The multispectral LIDAR device according to claim 12, wherein the wavelength-adjustable narrow band stopper is arranged on a radiation path of the laser radiation beam from the laser radiation source to the optical transceiver, or the wavelength-adjustable narrow band stopper is arranged on a radiation path of the laser radiation beam from the optical transceiver to the optical detector, or the wavelength-adjustable narrow band stopper is arranged on a radiation path of the laser radiation beam between the optical transceiver and the target.

14. The multispectral LIDAR device according to claim 12, wherein the wavelength-adjustable narrow band stopper is further configured to sequentially select a number N of selected wavelength, wherein N is comprised between 4 and 6, and wherein the spectral range of the laser beam is about 300 nm, between 1400 nm and 1700 nm.

15. The multispectral LIDAR device according to claim 12, wherein the wavelength-adjustable narrow band stopper comprises a filter per selected wavelength, wherein the filter is a notch filter having a narrow band value comprised between 9 nm and 20 nm, centered on said selected wavelength.

16. The multispectral LIDAR device according to claim 12, wherein the wavelength-adjustable narrow band stopper comprises a filter per selected wavelength, wherein the filter is selected from the list consisting of:

a Hard Coated Bandpass Filter having an Optical Density value of 4.0, and a narrow band value of 45 or 50 nm centered on said selected wavelength, or dichroic filters.

17. The multispectral LIDAR device according to claim 12, wherein the wavelength-adjustable narrow band stopper comprises a wavelength-tunable notch filter configured to block the narrow band centered on a notch wavelength, wherein the notch filter is controlled such as to tune the notch wavelength on the selected wavelength value.

18. The multispectral LIDAR device according to claim 12, wherein the wavelength-tunable notch filter is based on liquid crystal modulators or the wavelength-adjustable narrow band stopper comprises volume holographic notch filters.

19. The multispectral LIDAR device according to claim 12, wherein the transceiver has a spatial scanning function and the detector comprises a single radiation power optical sensor.

20. The multispectral LIDAR device according to claim 12, wherein a path of the laser radiation beam from the optical transceiver to the target coincides with a return path from the target to the optical transceiver.

* * * * *